US007880340B2

(12) United States Patent
Miller

(10) Patent No.: US 7,880,340 B2
(45) Date of Patent: Feb. 1, 2011

(54) RADIATION-TRIGGERED SEMICONDUCTOR SHUTDOWN DEVICE

(75) Inventor: Roy Mark Miller, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 96 days.

(21) Appl. No.: 11/741,452

(22) Filed: Apr. 27, 2007

(65) Prior Publication Data

US 2008/0266734 A1 Oct. 30, 2008

(51) Int. Cl.
*H01H 83/00* (2006.01)
(52) U.S. Cl. .................................. 307/130; 307/126
(58) Field of Classification Search .................. None
See application file for complete search history.

(56) References Cited

U.S. PATENT DOCUMENTS

| 3,581,119 | A | * | 5/1971 | Grundy | 327/214 |
|---|---|---|---|---|---|
| 4,287,535 | A | * | 9/1981 | Vakil | 348/378 |
| 4,748,594 | A | | 5/1988 | Iida | |
| 4,749,919 | A | * | 6/1988 | Beaumont et al. | 315/386 |
| 5,107,139 | A | * | 4/1992 | Houston et al. | 327/18 |
| 5,589,708 | A | * | 12/1996 | Kalnitsky | 257/646 |
| 6,414,318 | B1 | * | 7/2002 | Uber et al. | 250/389 |
| 6,441,440 | B1 | | 8/2002 | Brady et al. | |
| 6,553,496 | B1 | * | 4/2003 | Buer | 726/34 |
| 6,617,581 | B2 | * | 9/2003 | Pompei | 250/349 |
| 6,665,161 | B1 | | 12/2003 | Brady et al. | |
| 6,690,098 | B1 | * | 2/2004 | Saldana | 307/125 |
| 6,794,733 | B1 | | 9/2004 | Brady et al. | |
| 6,909,159 | B2 | * | 6/2005 | Friend et al. | 257/428 |
| 6,969,859 | B2 | * | 11/2005 | Klaasen et al. | 250/370.01 |
| 2002/0153899 | A1 | * | 10/2002 | Watanabe et al. | 324/537 |
| 2006/0138336 | A1 | * | 6/2006 | Seino et al. | 250/370.13 |
| 2007/0253132 | A1 | * | 11/2007 | Nakamura et al. | 361/103 |

* cited by examiner

*Primary Examiner*—Jared J Fureman
*Assistant Examiner*—Adi Amrany
(74) *Attorney, Agent, or Firm*—Zagorin O'Brien Graham LLP

(57) ABSTRACT

An integrated circuit includes a radiation-triggered shutdown circuit that disables a critical aspect of the integrated circuit rendering the integrated circuit non-functional when the integrated circuit receives a predetermined radiation dose. That ensures integrated circuits including the radiation-triggered shutdown circuit are ITAR compliant.

12 Claims, 4 Drawing Sheets

RADIATION-TRIGGERED SEMICONDUCTOR SHUTDOWN DEVICE

CROSS-REFERENCE TO RELATED APPLICATION(S)

Not Applicable

BACKGROUND

1. Field of the Invention

This application relates to integrated circuit operation in the presence of radiation.

2. Description of the Related Art

International Traffic in Arms Regulations (ITAR) provide a set of government regulations (see Title 22 of the Code of Federal Regulations, Part 121) that place specific limitations on the export of semiconductor devices having a specified radiation hardness to prevent the export of devices that might have usefulness in space-borne or military systems. Many space applications have radiation-hardened requirements due to the presence of radiation in the space environment that would cause the systems to fail. ITAR presents a problem for commercial electronics and semiconductors that happen to be radiation hard but have commercial applications world-wide.

Advances in semiconductor processes that have been adopted to improve the performance of products like microprocessors coincidentally make the products more radiation hard. Specifically, smaller transistors with thin oxides are much less susceptible to radiation than counterparts even a few years earlier. Thus, it is growing more likely that commercial semiconductors may become subject to export restrictions based on ITAR. It can be expensive and time consuming to determine the radiation hardness of a commercial semiconductor part, and many companies can afford neither the time nor the money to test for radiation hardness and prove ITAR compliance. Thus, it would be desirable to provide a cheap and easy way to be ITAR-compliant in commercial semiconductor devices without the time and expense of testing for ITAR compliance.

SUMMARY

Accordingly, a radiation-triggered shutdown circuit is provided that in response to a predetermined radiation dose, disables a critical aspect of the integrated circuit or otherwise renders the integrated circuit non-functional.

In an embodiment, the integrated circuit includes a radiation-triggered shutdown circuit responsive to a received radiation dose being larger than a predetermined radiation dose to render the integrated circuit inoperable.

In an embodiment, the radiation-triggered shutdown circuit includes a detector circuit configured to provide a signal having a first value in response to the received radiation dose being below the predetermined radiation dose and a second value in response to the radiation dose being above the predetermined radiation dose.

In an embodiment, the radiation-triggered shutdown circuit includes a disable circuit coupled to the detector. The disable circuit uses the signal from the detector as a control signal and supplies a signal to allow proper operation of the integrated circuit in response to the control signal being at the first value and renders the integrated circuit inoperable in response to the control signal being at the second value.

In an embodiment, the radiation-triggered shutdown circuit includes a plurality of detector circuits, each configured to supply a trigger signal having a first value in response to the received radiation dose being below the predetermined radiation dose and a second value in response to the radiation dose being above the predetermined radiation dose. A voting circuit is coupled to receive the trigger signals from the respective detector circuits and to supply a disable control signal according to a voting scheme, the disable control signal indicative of whether to disable the integrated circuit.

In an embodiment, the predetermined radiation dose is below about 500 Krads and may be in the range of about 200 Krads to about 300 Krads.

In another embodiment, a method is provided that includes detecting in a detector circuit in an integrated circuit if a predetermined dose of radiation has been received and supplying a detection signal indicative thereof; and receiving the detection signal at a disable circuit and in response to an asserted detection signal, disabling the integrated circuit.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
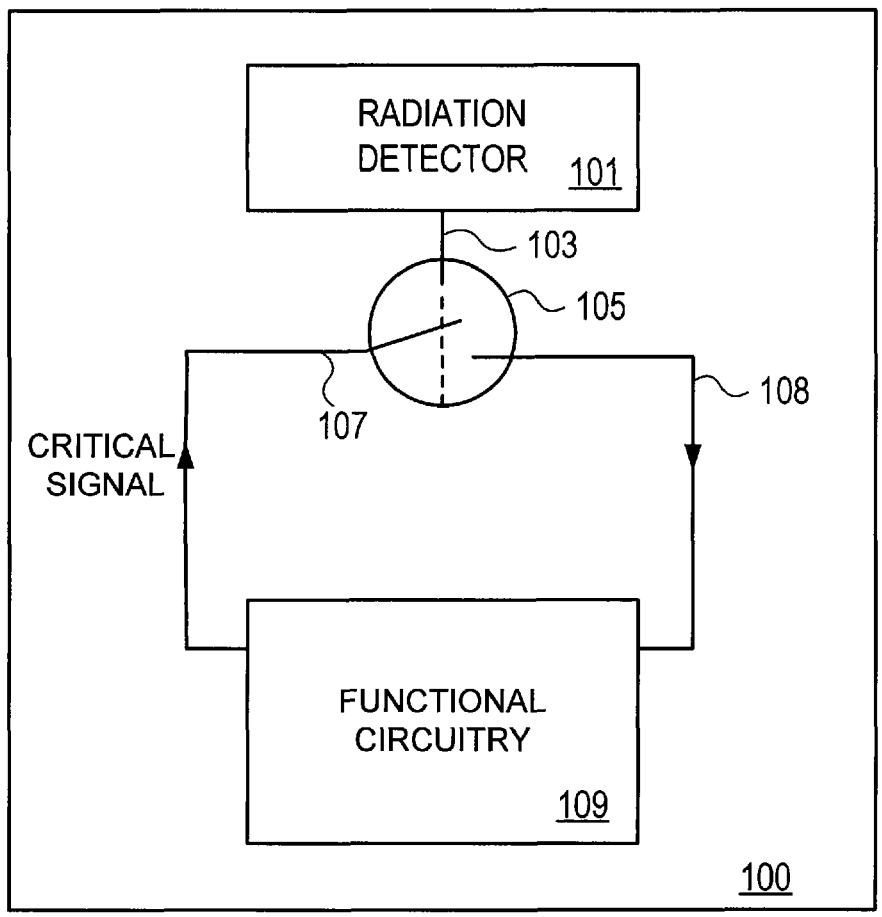
FIG. 1 is a conceptual block diagram of an embodiment of the invention.

Referring to FIG. 1, illustrated is a block diagram of an integrated circuit (IC) 100, according to an embodiment of the invention. The IC includes a radiation detector 101, which supplies a control signal 103 to a disable circuit 105, implemented as a switch in the embodiment shown in FIG. 1. The switch controls whether a critical signal, such as a clock signal, a reset signal, etc., supplied to the switch on node 107 is supplied to the functional circuitry on 109. When radiation detector 103 detects a radiation detection level less than a predetermined level, the switch 105 remains closed and the critical signal is supplied and used by the functional circuitry. When the radiation detector 101 detects a radiation level above the predetermined level, the switch opens causing the critical signal to fail to reach the functional circuitry 109. For example, the critical signal may be a clock signal and the functional circuitry 109 fails to work properly when the switch is open. Thus, any critical signal that, if missing, would render the device inoperable can be supplied through switch 105.

Figure 2:
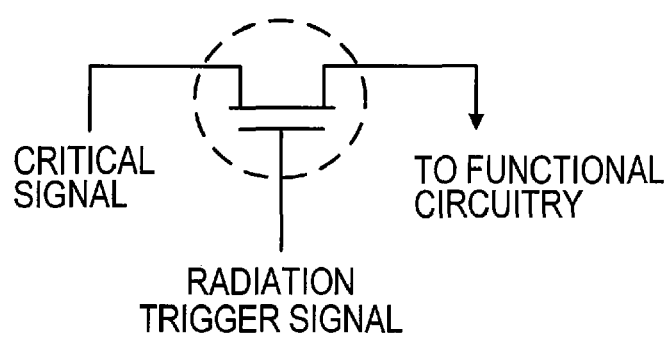
FIG. 2 illustrates an embodiment of a disable mechanism utilizing a pass gate.
Figure 3:
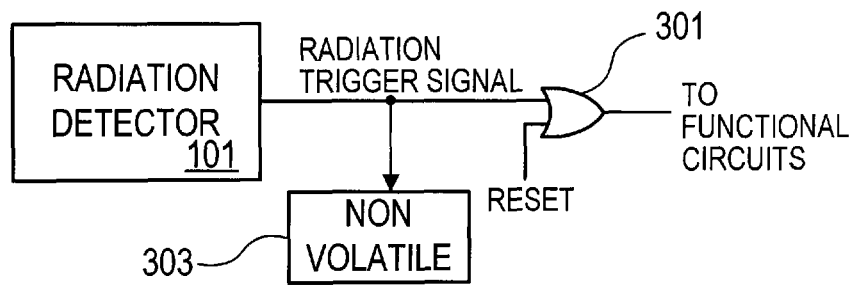
FIG. 3 illustrates a detection and disable mechanism according to an embodiment of the invention.

As shown in FIG. 2, the disable circuit 105 may be implemented as a pass gate. In various embodiments, such as illustrated in FIG. 3, the radiation detection mechanism may provide a disable signal to the functional circuitry causing the integrated circuit to be disabled when the disable signal is asserted. For example, as shown in FIG. 3, the detector circuit 101 supplies the radiation trigger signal (assumed to be active high) to be ORed with a reset signal (assumed to be active high in this embodiment) to maintain the IC in a reset state when the radiation detector detects a level of radiation above the predetermined level, thus rendering the IC non-functional.

Those of skill in the art could readily implement many circuits, using the teachings herein, to cause the functional circuitry to fail in response to a trigger signal indicating that a threshold level of radiation has been detected. That is, the integrated circuit could readily be made inoperable given the teachings herein after receiving the radiation levels specified in ITAR. The permanence of radiation damage to silicon structures is very dependant on the type and energy of the radiation and also the conditions of the circuit when irradiated (bias, temp. etc.). However, even damage that can be annealed usually requires time and temperature that are beyond the practical operating points. Generally, military applications consider the damage effectively permanent if the circuit cannot immediately be put in service after the dose. Note that it is possible to set a nonvolatile memory write-once memory location (303 in FIG. 3), by using a fuse or other mechanism, to make a permanent record of the dosing event and/or to ensure the shutdown is a permanent condition once a dosing event has been detected.

ITAR specifies multiple characteristics that a device has to have in order to be classified as radiation hardened. Those characteristics include total dose ($5 \times 10^5$ Rads (Si)); dose rate upset ($5 \times 10^8$ Rads (Si)/sec)); neutron dose $1 \times 10^{14}$ N/cm² Rads (Si)/Sec)), single event upset of $1 \times 10^{-7}$ error/bit/day; single event latch-up free and having a dose rate latch-up of $5 \times 10^8$ Rads (Si)/sec or greater. The total dose specification can be used as a shutdown trigger for most if not all devices. Other required ITAR characteristics such as dose rate upset, or neutron dose, would be more difficult to use as a shutdown trigger. But, by ensuring that the device fails to have at least one of the characteristics, an exported device having the radiation-triggered shutdown circuit, including the radiation trigger and disable mechanism described herein should comply with ITAR. Note that the radiation doses specified are for a semiconductor material.

The radiation trigger and disable mechanism should detect the radiation dose and disable the IC in reaction to doses of approximately 500K Rads or below. For example, if the radiation-triggered shutdown circuit triggers in the range of approximately 200K to 300K Rads, that gives a comfortable margin of failing well before the 500K Rads specified by ITAR. While targeting the design to fail in the 200K Rads to 300K Rads may be preferable to give a comfortable margin, in other embodiments, other ranges may be better, depending on the particular integrated circuit. Whatever radiation range, or specific radiation value is chosen, the integrated circuit should fail at or below 500K Rads or the appropriate radiation threshold.

Figure 4:
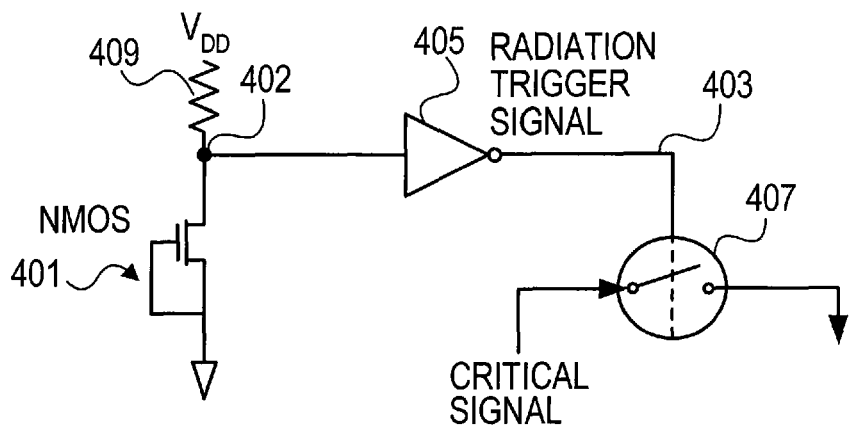
FIG. 4 illustrates a radiation detection and disable circuit according to an embodiment of the invention that makes use of the leakage current $I_{DS}$ in a transistor that increases with radiation dose.

Referring to FIG. 4, illustrated is an embodiment of a radiation trigger that makes use of the leakage current $I_{DS}$ in transistor 401 that increases with radiation dose. Without significant leakage current, the voltage at node 402 is $V_{DD}$ (logic high). As the total ionizing dose (TID) increases, the drain-to-source current in transistor 401 increases such that the voltage at node 402 moves from high to low and the radiation trigger signal 403 supplied by inverter 405 moves from low to high causing switch 407 to change state (to an open or closed position). Note that the polarity of the asserted signal is design dependent. The resistor 409 may be radiation hardened, e.g., formed out of metal instead of polysilicon, to prevent any charge from accumulating in the resistor and affecting operation of the radiation detector.

Although MOS transistors are frequently discussed as having a drain, a gate, and a source, in most such devices the drain is interchangeable with the source. This is because the layout and semiconductor processing of the transistor is symmetrical. For an N-channel MOS transistor, the current handling terminal normally residing at the higher voltage is customarily called the drain. The current handling terminal normally residing at the lower voltage is customarily called the source. For convenience, such standard nomenclature is utilized herein.

Figure 5:
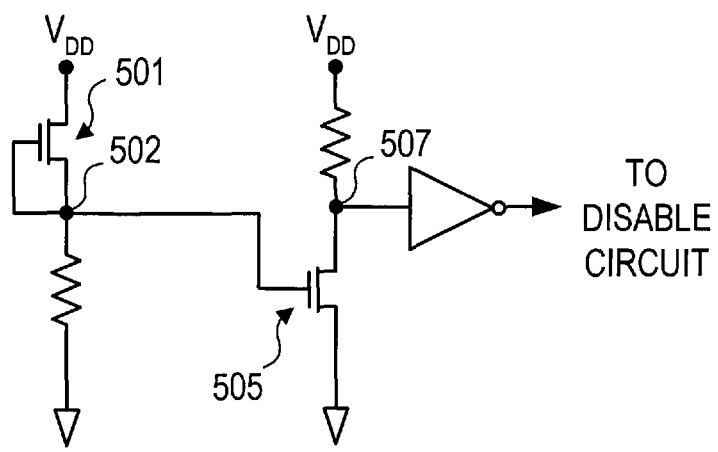
FIG. 5 illustrates a radiation detector circuit according to another embodiment of the invention.

Referring to FIG. 5, another embodiment is illustrated that provides a gain factor over the embodiment illustrated in FIG. 4. N-channel transistor 501 operates in a manner similar to transistor 401. As the leakage current through transistor 501 increases, the voltage at node 502 increases. Once the voltage at node 502 increases sufficiently, n-channel transistor 505 turns on, causing node 507 to be pulled down. Note that as the voltage on 502 rises due to the radiation, the threshold voltage of transistor 505 is being lowered and the leakage current increases. Thus, the circuit shown in FIG. 5 is even more sensitive to radiation.

Figure 6:
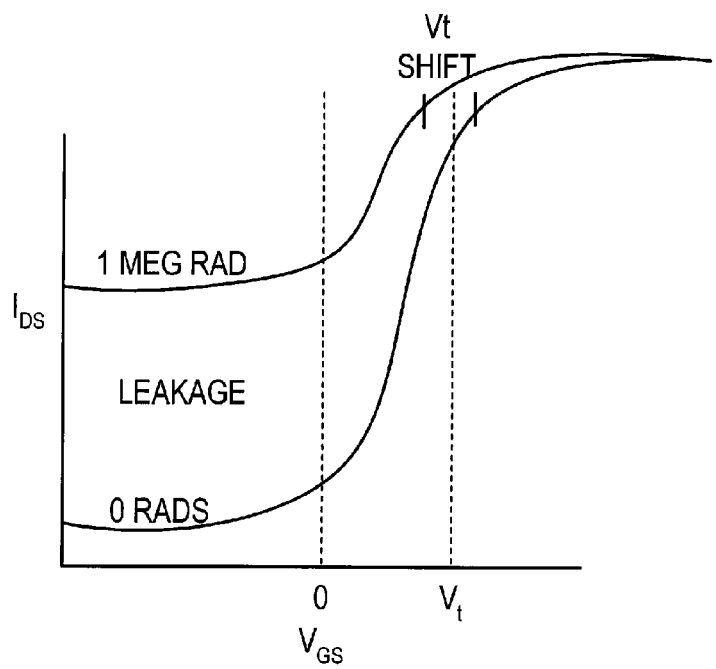
FIG. 6 is a graph that illustrates the increasing drain to source current and shift in Vt due to a received radiation dose.

FIG. 6 is a graph illustrating the increased $I_{DS}$ current based on a total ionizing dose. As can be seen from the graph, the current $I_{DS}$ is significantly increased with the gate voltage $V_{GS}$ at 0. Note also that the threshold voltage Vt shifts lower in the presence of ionizing radiation.

Figure 7:
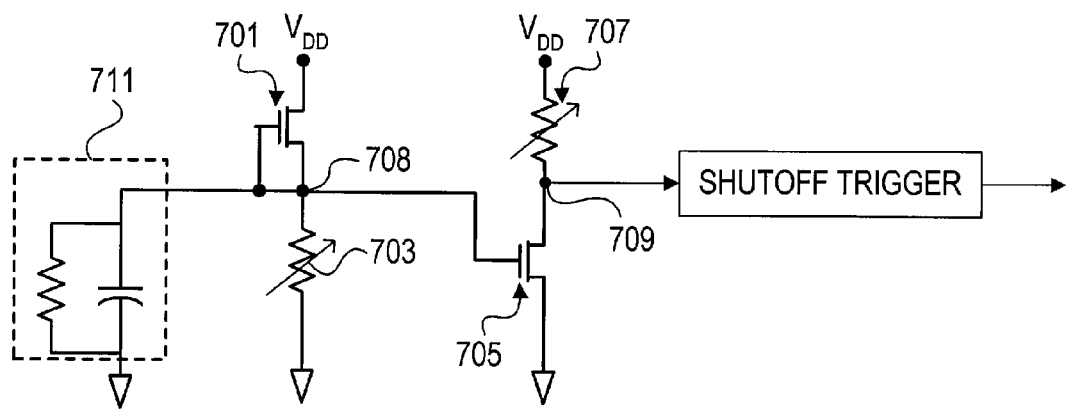
FIG. 7 illustrates a tunable radiation detector circuit according to an embodiment of the invention.

FIG. 7 illustrates another embodiment that provides the ability to calibrate the radiation detector. The embodiment in FIG. 7 is similar to that in FIG. 5. N-channel transistor 701 has its source (and gate) coupled to a programmable resistor 703 and its drain coupled to $V_{DD}$. N-channel transistor 705 has a terminal coupled to variable resistor 707, which is preferably radiation hardened, and its gate is coupled to node 708. In operation, as node 708 grows more positive with increased leakage current, transistor 705 turns on, causing the voltage on node 709 to decrease and providing a trigger mechanism to disable the integrated circuit. The voltage on node 709 also decreases due to the radiation induced leakage current in transistor 705. Note that transistors 701 and 705 are preferably long channel, low-leakage transistors. It is best for transistors 701 and 705 to have low natural leakage so that anything induced by radiation due to charge trapping is easily detected. The problem with today's short channel transistors is that they leak significantly, which can overwhelm many parasitic effects such as radiation damage. The RC circuit 711 provides a filtering mechanism so that unexpected spikes on the power supplies do not inadvertently cause the integrated circuit to shut down. Note that designers should not neglect the parasitic resistance and leakage of the capacitance. The circuit shown in FIG. 7 should provide a significant gain factor and trip earlier than other circuits, such as the circuit shown in FIG. 4.

The programmable resistors may be set to trigger the switch according to a calibrating radiation dose supplied to the integrated circuit. For example, the design may be calibrated to trigger at one half of the ITAR total dose specification (250 KRad). The resistors are adjusted until the trigger trips at that point. The number of samples calibrated may depend on a particular circuit and system design parameters and the design margin. Once the settings for the resistors are known, they may be programmed into the integrated circuits containing the radiation trigger of FIG. 7 through fuses, e.g., laser or electrically programmable, or metal masks or other appropriate programmable resistor technology.

Figure 8:
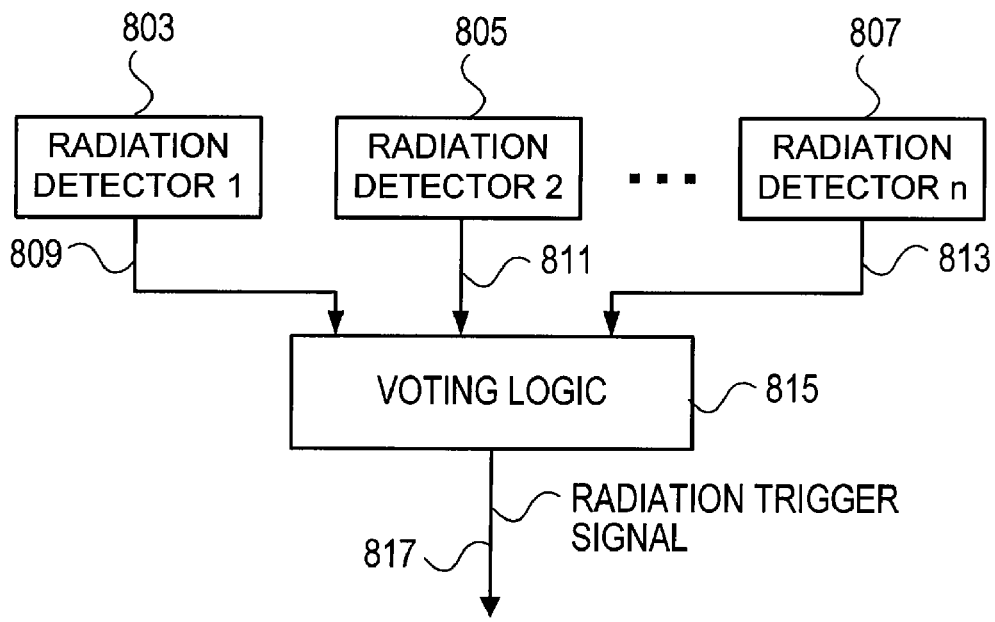
FIG. 8 illustrates an embodiment in which multiple detectors detect radiation and voting is used to determine whether to assert the radiation trigger signal.

Referring to FIG. 8, in an embodiment of the invention, multiple detectors 803, 805, 807, are utilized. Those detectors may utilize any radiation detector suitable to detect a total dose in accordance with the teachings herein. The detectors provide their trigger signals 809, 811, and 813 to voting logic 815. The voting logic may be implemented in a manner to require all of the detectors to assert their radiation trigger signal, e.g., an AND gate, or may be implemented in a more complex majority vote circuit. Such circuits are well known in the art and will not be described further herein. Further, various types of detectors may be used and different weights assigned to the detectors. Once the voting logic, implementing an appropriate voting scheme, indicates a triggering event has occurred, the voting logic 815 supplies the trigger signal 817 to a switch (not shown in FIG. 8) that is configured to cause the IC to fail in the event of an asserted trigger signal. Using multiple triggers and voting ensures that a single erroneously operating detector does not shut down the integrated circuit in circumstances not warranting a shutdown.

Figure 9:
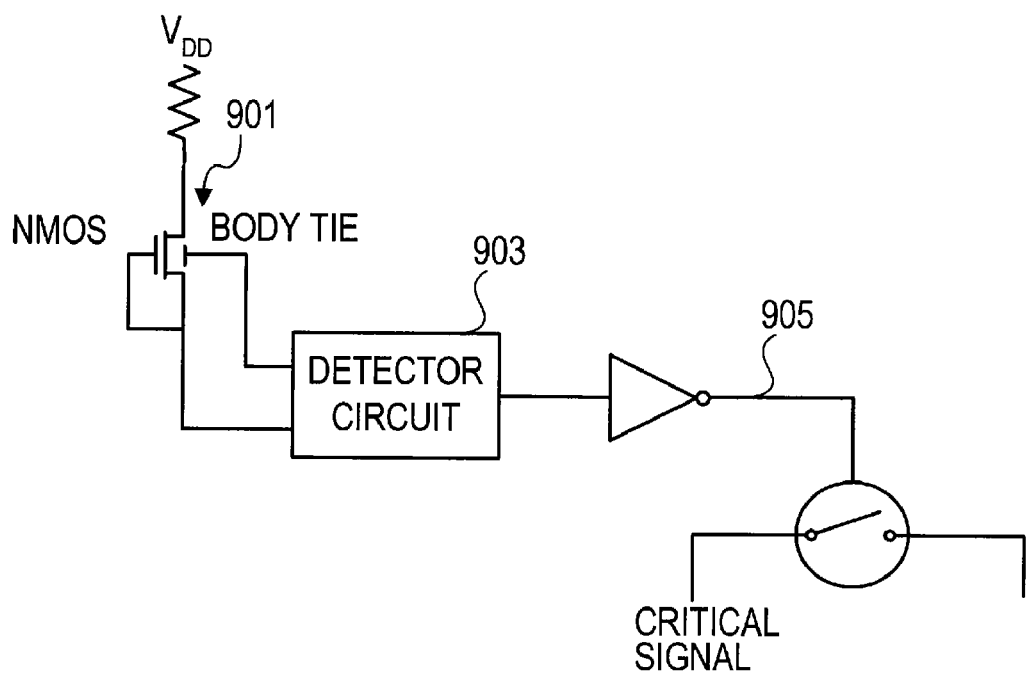
FIG. 9 illustrates a detector circuit according to another embodiment of the invention.

Another embodiment, illustrated in FIG. 9, makes use of the large back body threshold voltage shifts that occur in silicon on insulator (SOI) integrated circuits. In SOI technology, the buried oxide (BOX) in particular traps charge under ionizing radiation. That results in a significant shift in back body threshold voltage. FIG. 9 illustrates a block diagram of a detection mechanism utilizing transistor 901 and a detector circuit 903 to provide a radiation trigger signal 905 on detection of that shift in threshold voltage. With proper layout to isolate the transistor nodes, a circuit can be constructed to detect a shift in the body threshold which is typically in the tens of volts with today's technology. This may not be as practical as other circuits described herein, given current process technology.

While the preferred embodiments of the invention have been illustrated and described, it will be clear that the invention is not limited to these embodiments only. Other variations, modifications, changes, substitutions and equivalents of the embodiments disclosed herein will be apparent to those skilled in the art based on the description set forth herein without departing from the scope of the invention as described in the following claims.

What is claimed is:

1. An integrated circuit comprising:
    a radiation-triggered shutdown circuit responsive to a received radiation dose being larger than a predetermined radiation dose to render the integrated circuit inoperable;
    wherein the radiation-triggered shutdown circuit further comprises a detector circuit configured to provide a detect signal having a first value in response to the received radiation dose being below the predetermined radiation dose and a second value in response to the radiation dose being above the predetermined radiation dose; and
    wherein the detector circuit comprises,
    a first transistor coupled between a first power supply and a first node, a gate of the first transistor being coupled to the first node;
    a second transistor coupled between a second node and ground, a gate of the second transistor being coupled to the first node;
    a first resistor coupled between the first node and ground; and
    a second resistor coupled between the first power supply and the second node; and
    wherein the second node supplies the detect signal of the detector circuit.

2. The integrated circuit as recited in claim 1 wherein the radiation-triggered shutdown circuit further comprises a disable circuit coupled to the detector circuit and configured to use the detect signal from the detector circuit as a control signal, the disable circuit responsive to the control signal being at the second value to supply a signal to render the integrated circuit inoperable and responsive to the first value of the control signal to allow proper operation of the integrated circuit.

3. The integrated circuit as recited in claim 2 wherein a critical signal required for proper operation of the integrated circuit is supplied by the disable circuit.

4. The integrated circuit as recited in claim 3 wherein the critical signal is one or more of a reset signal and a clock signal.

5. The integrated circuit as recited in claim 3 wherein the disable circuit is a switching circuit and the critical signal is supplied by the switching circuit when the control signal is at the first value and is not supplied by the switching circuit when the control signal is at the second value.

6. The integrated circuit as recited in claim 1 wherein the first and second resistors are variable resistors and a trigger point of the detector circuit corresponding to the received radiation dose is determined according to, at least in part, settings of the variable resistors.

7. The integrated circuit as recited in claim 1 wherein the detector circuit utilizes transistor leakage current that increases according to the radiation dose.

8. The integrated circuit as recited in claim 1 wherein the integrated circuit is a silicon on insulator integrated circuit and the detector circuit utilizes a threshold voltage (Vt) shift due to charges trapped in a buried oxide layer due to radiation.

9. The integrated circuit as recited in claim 1 wherein the predetermined radiation dose is below about 500 Krads.

10. The integrated circuit as recited in claim 9 wherein the predetermined radiation dose is in the range of about 200 Krads to about 300 Krads.

11. The integrated circuit as recited in claim 1
    wherein the radiation-triggered shutdown circuit further comprises:
    at least two additional detector circuits, each of the additional detector circuits configured to provide respective detect signals having the first value in response to the received radiation dose being below the predetermined radiation dose and the second value in response to the radiation dose being above the predetermined radiation dose; and
    a voting circuit coupled to receive the detect signals from respective ones of the detector circuits and to supply a disable control signal according to a voting scheme, the disable control signal indicative of whether to render the integrated circuit inoperable.

12. The integrated circuit as recited in claim 1 further comprising an RC filter coupled between the first node and ground.

* * * * *